United States Patent [19]

Busk

[11] Patent Number: 5,701,809
[45] Date of Patent: Dec. 30, 1997

[54] PLANT FOR CONTINUOUSLY PROCESSING CHEESE MASS

[75] Inventor: Per Busk, Silkeborg, Denmark

[73] Assignee: APV Pasilac A/S, Aarhus C, Denmark

[21] Appl. No.: 624,421

[22] PCT Filed: Sep. 27, 1994

[86] PCT No.: PCT/DK94/00359

§ 371 Date: Apr. 1, 1996

§ 102(e) Date: Apr. 1, 1996

[87] PCT Pub. No.: WO95/09527

PCT Pub. Date: Apr. 13, 1995

[30] Foreign Application Priority Data

Oct. 1, 1993 [DK] Denmark .................. 1105/93

[51] Int. Cl.⁶ .................. A23C 19/02; A23C 19/064; A23C 19/072; A01J 11/00
[52] U.S. Cl. .................. 99/459; 99/452; 99/456
[58] Field of Search .................. 99/452–466, 443 C; 426/491, 495, 36, 41, 582

[56] References Cited

U.S. PATENT DOCUMENTS

| | | |
|---|---|---|
| 3,797,380 | 3/1974 | Tate . |
| 4,217,818 | 8/1980 | Hazen . |
| 4,309,941 | 1/1982 | Brockwell .................. 99/453 |
| 4,820,540 | 4/1989 | Budahn .................. 426/582 |
| 4,879,946 | 11/1989 | Blodgett et al. .................. 99/453 |
| 4,964,334 | 10/1990 | Jay .................. 99/459 |
| 4,976,981 | 12/1990 | Skovhage et al. .................. 99/456 X |
| 5,384,137 | 1/1995 | Bilioli et al. .................. 426/36 |

*Primary Examiner*—Timothy F. Simone
*Attorney, Agent, or Firm*—Lowe, Price, LeBlanc & Becker

[57] ABSTRACT

A plant for continuously processing cheese mass (7) comprises a first substantially horizontal conveyor (1) conveying the cheese mass (7) in one direction and a second substantially horizontal conveyor (2) conveying the cheese mass (7) in the opposite direction. The second conveyor (2) is accommodated below the first conveyor (1) and is adapted to receive the cheese mass (7) from the exit end of the first conveyor via a guide plate (14) carrying the cheese mass obliquely downwards onto the second conveyor (2). Transferring means (8,10) are accommodated at the exit end of the first conveyor, said transferring means comprising guide surfaces (9,11) supporting the cheese mass (7) in a downwardly inclining path towards the guide plate (14).

5 Claims, 2 Drawing Sheets

PLANT FOR CONTINUOUSLY PROCESSING CHEESE MASS

TECHNICAL FIELD

The invention relates to a plant for continuously processing cheese mass and comprising a first substantially horizontal conveyor conveying the cheese mass in one direction and a second substantially horizontal conveyor conveying the cheese mass in the opposite direction, said second conveyor being accommodated below the first conveyor and being adapted to receive the cheese mass from the exit end of the first conveyor via a guide plate arranged at the exit end of the first conveyor and adapted to receive the cheese mass therefrom and carry it obliquely downwards onto the second conveyor.

BACKGROUND ART

It is generally known in connection with continuous processing of cheeses that the cheese mass is advanced onto a conveyor belt after having left the curdling vessel. A continued draining of the whey from the curd is performed on the conveyor belt. The cheese mass drained off is advanced on additional conveyor belts, on which said cheese mass is subjected to a processing which is of decisive importance for the final texture, taste, and mechanical strength of the cheese. This processing includes among other things a so-called caking of the cheese mass because the cheese grains melt together while forming a coherent cheese cake. This processing requires a relatively long stay, such as for instance two hours, on the conveyor belt before the cheese cake is ready for the final cutting out.

In order to reduce the room requirements to the plant, a solution has in connection with large plants often been to let the stay on the conveyor belt be performed on several conveyor belts arranged above one another, whereby the cheese mass is initially placed on the uppermost conveyor belt and then carried downwards therefrom onto a conveyor belt there-below. The carrying from the uppermost conveyor belt must be performed relatively leniently. It has therefore been decided to let the cheese cake pass over the exit end of the first conveyor belt and directly by way of gravity downwards onto an inclining guide plate. At a relatively acute angle the inclining guide plate advances the cheese cake in the same direction as the one in which the second conveyor belt therebelow moves, said cheese cake leaving the guide plate immediately above said second conveyor belt. While passing from the first conveyor belt to the second conveyor belt the cheese cake is preferably turned over. While passing from the first conveyor belt onto the second conveyor belt the cheese cake is subjected to a stretching followed by a compression, said cheese cake initially being stretched out and subsequently being stopped and compressed again. Such an effect turned out to be advantageous for the final result. It turned out, however, that while passing from the exit end of the first conveyor belt and downwards onto the guide plate the cheese cake may have a tendency to go to pieces, which means that the cheese cake loses its continuous connection which in turn has a disadvantageous effect on the final cheese. Among other things the desired structure can be effected.

BRIEF DESCRIPTION OF THE INVENTION

The object of the invention is to provide a plant ensuring that the cheese cake can pass leniently from one conveyor to the following conveyor while maintaining the favourable stretching and compressing effect.

The plant according to the invention is characterised in that transferring means are accommodated at the exit end of the first conveyor, said transferring means comprising guide surfaces supporting the cheese mass in a downwardly inclining path towards the guide plate. Such transferring means ensure that the cheese cake is not subjected to a free fall, but nevertheless moves by way of gravity downwards along the guide surface while being subjected to a predetermined stretching. When meeting the guide plate turning the moving direction of the cheese cake, said cheese cake is subjected to a compressing followed by an additional stretching during the continued advancing down said guide plate until the cheese cake meets the second conveyor, where it is again subjected to a compressing. The necessary relatively long stay on the conveyor belts implies that said conveyor belts are moved relatively slowly, and the necessary stretching across the guide surfaces of the transferring means is adjusted by means of a suitable angle of inclination relative to the advancing direction of the first conveyor belt. Such a guiding of the cheese mass turned out to be particularly suited for a continuous production of cheese of the Cheddar type. The use of the plant for production of cheese of the Cheddar type resulted in a first-class cheese presenting the necessary texture, taste, and mechanical strength.

In order to adjust the plant to the thickness or height of the cheese cake in question on the conveyor belts, the cheese-mass-supporting guide surfaces of the transferring means may according to the invention be adjustable with respect to the extent in the advancing direction of the cheese mass.

According to the invention the transferring means may particularly advantageously comprise a fixed rod adjacent the first conveyor, said rod forming a bridge between said first conveyor and an adjustable rod with surface portions of a varying extent and co-operating with the cheese mass. In this manner the adjustable rod can be adjusted to the surface portion of the desired extent for co-operation with the cheese mass.

According to the invention the adjustable rod may particularly advantageously be an eccentrically mounted body with a surface forming a cylindrical surface of a normal section, said cylindrical surface extending substantially elliptically at least within the portion co-operating with the cheese mass. As a result, a turning of the adjustable rod causes a continuous adjustment of the extent of the guide surface towards the guide plate.

Finally according to the invention the guide surface of the transferring means may incline downwardly approximately 40° relative to horizontal, whereby a suitable extent of the cheese cake is ensured without said cheese cake being separated or split up.

BRIEF DESCRIPTION OF THE DRAWING

The invention is described in greater detail below with reference to the accompanying drawing, in which.

BEST MODE FOR CARRYING OUT THE INVENTION

Figure 1:
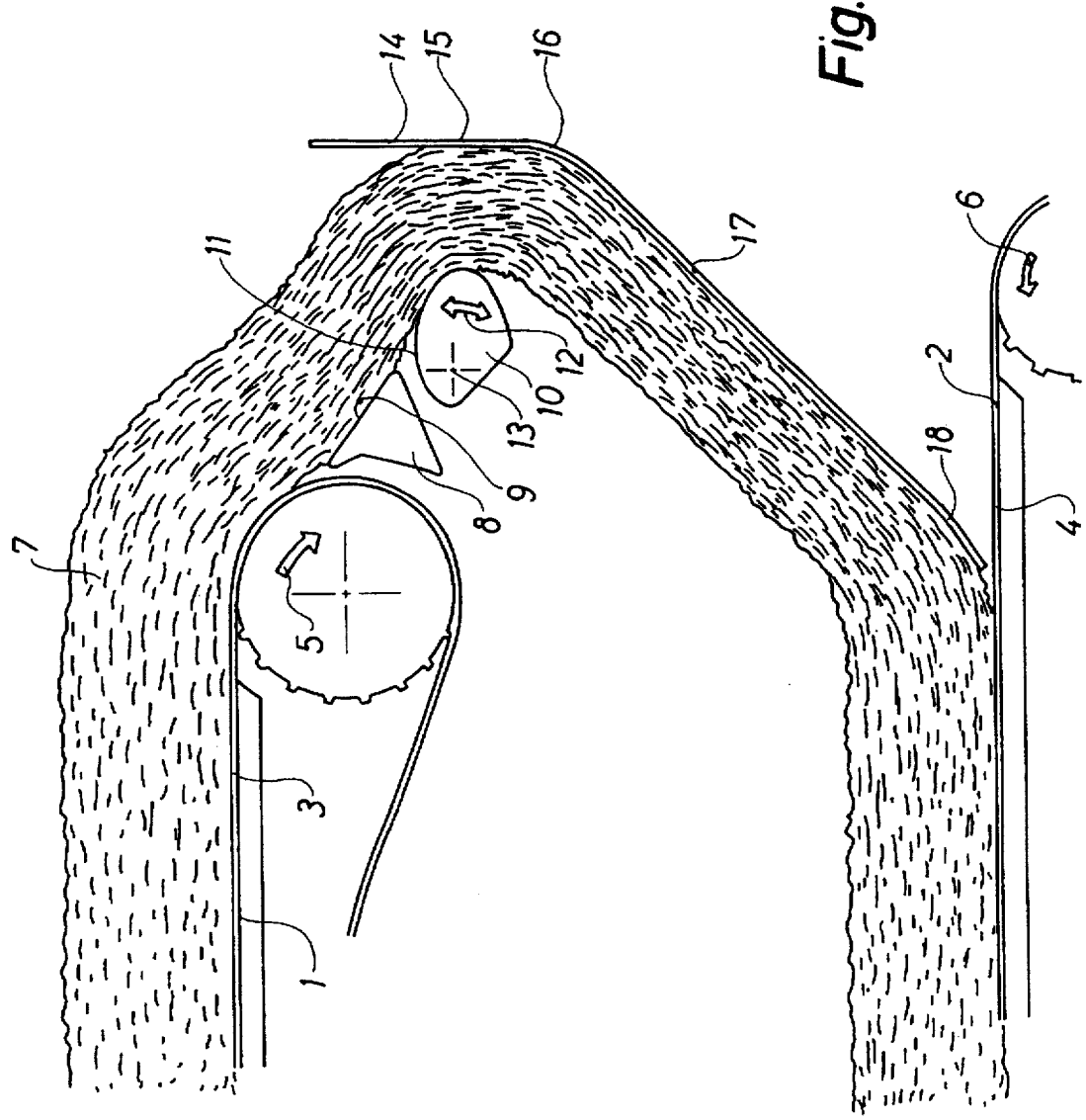
FIG. 1 is a diagrammatic side view of parts of a plant according to the invention immediately adjacent the exit end of a first conveyor and the inlet end of a second conveyor therebelow, wherein a continuously advanced cheese cake is indicated by means of broken and winding lines.

FIG. 1 illustrates a first conveyor 1 and a second conveyor 2 arranged above one another and forming part of a plant for continuously processing cheeses. The two conveyors 1 and 2 move their respective conveyor belt 3 and 4 forwards in the direction indicated by means of an arrow 5 and 6, respectively, cf. FIG. 1. As indicated by means of broken and winding lines, a cheese mass 7 is advanced by means of the two conveyors, said cheese mass being made of curd melted into a coherent cheese cake.

At the exit end of the first conveyor 1, the cheese cake 7 initially passes over a fixed rod 8, which is secured to the carrying frame of the plant in a manner not shown in greater detail. The rod 8 comprises an upward surface 9 forming a downwardly inclining contact surface for the cheese cake 7. After the fixed rod 8, the cheese cake 7 passes across an eccentrically mounted, adjustable rod 10. The rod 10 is formed by a body with an outer surface forming a cylindrical surface of a normal section being substantially elliptical at least over the portion 10 engaging the cheese cake. The adjustable rod 10 is pivotally mounted in a manner not described in greater detail and such that it can be set with various positions about its axis of rotation 13 as indicated by the double arrow 12. This setting is preferably performed manually by the operator in response to the thickness or height of the cheese cake 7 on the conveyor belt 1.

After the adjustable rod 10, the cheese cake 7 is advanced towards a guide plate 14. In the area opposite the adjustable rod, the guide plate 14 comprises a substantially vertically extending portion 15, which continues downwardly through a curved bend 16 into an inclining, substantially plane portion 17. The latter portion carries the cheese cake 7 downwards to the second conveyor 2 along an inclining path forming an acute angle with the surface of the second conveyor 2. Immediately above the conveyor belt 4 of the second conveyor 2, the guide plate 14 may comprise an additional curved bend 18 transferring the cheese cake 7 particularly leniently onto the conveyor belt 4.

Figure 2:
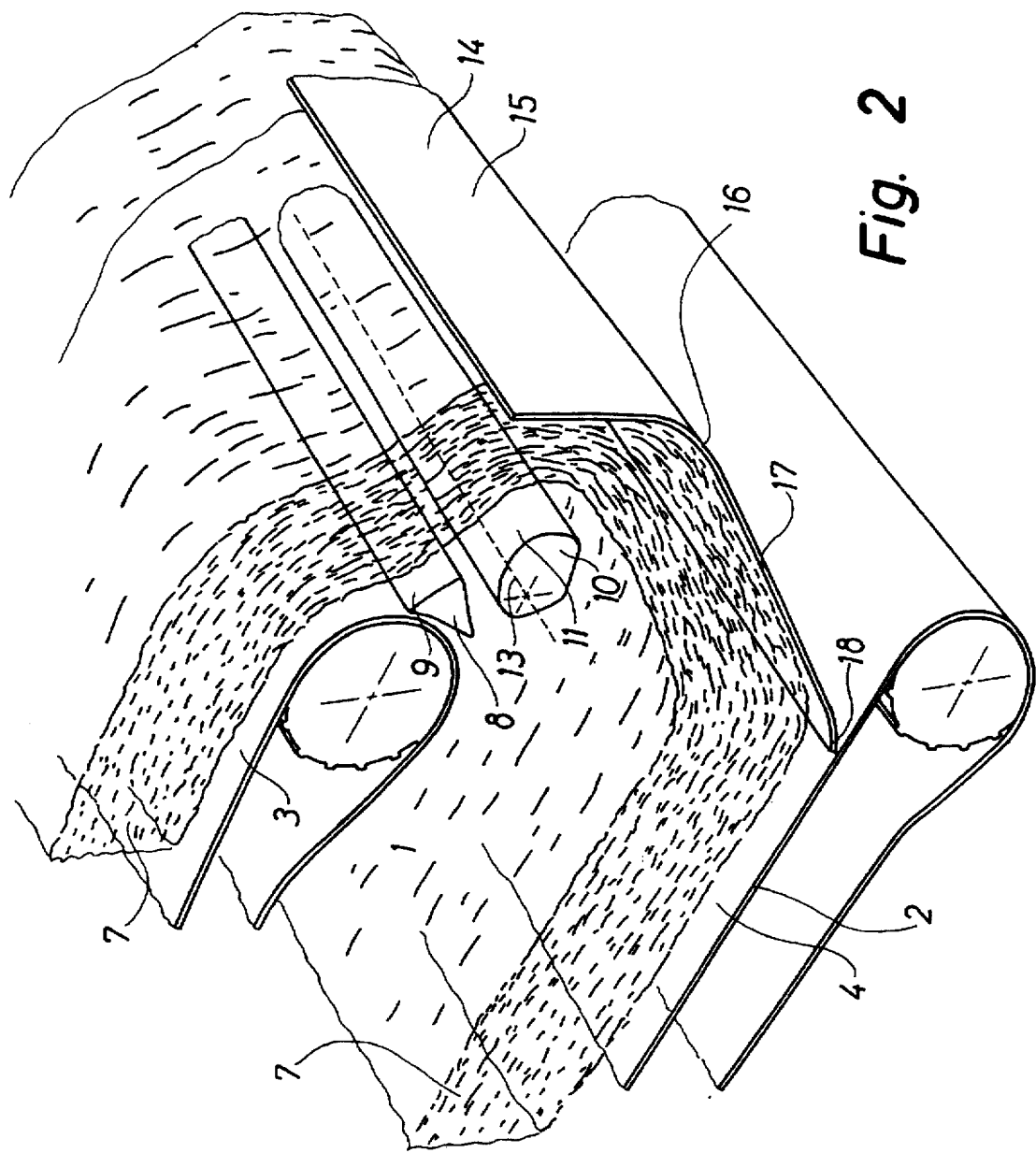
FIG. 2 is a perspective view of the parts of FIG. 1, whereby parts have been omitted for the sake of clarity.

As illustrated in the drawing, the cheese mass passes in a coherent cake 7 downwards over the fixed rod 8 and the adjustable rod 10 and subsequently towards the guide plate 14. The adjustable rod 10 is as mentioned adjusted in response to the thickness of the cheese cake 7 and in such a manner that said cheese cake 7 maintains its coherent state while passing from the adjustable rod 10 onto the guide plate 14. The adjustable rod is turned clockwise downwards when the cheese cake 7 is relatively thick and upwards counter-clockwise substantially into the position shown in FIGS. 1 and 2 when the cheese cake 7 is relatively thin. The fixed rod 8 and the adjustable rod 10 form together an inclining guide surface for the cheese cake. This guide surface inclines downwards and is adjusted such that it allows the cheese mass 7 to be subjected to a predetermined stretching, but also to such a friction that it does not moves too fast or goes to pieces. Accordingly, the guide surface is suitably provided with a downward inclination of approximately 40°. An inclination of 50° in connection with thin cheese cakes involves a too low friction for preventing the ingredients of the cheese cake from splitting up. An inclination of less than approximately 35° involves a too strong compressing or stopping of the cheese cake when said cheese cake meets the guide plate 14.

Having entered the guide plate 14, the cheese cake 7 is subjected to an additional stretching while passing down the inclining, plane portion 17 of the guide plate 14. Having entered the conveyor belt 4 of the second conveyor 2, the cheese cake is again subjected to a compressing. The latter compressing must also be performed under such circumstances that the ingredients of the cheese cake are not split up at any time, which implies that the guide plate 14 must incline approximately 45° relative to the upper surface of the second conveyor 2.

The two conveyors 1 and 2 can have a belt width of from less than 2 m and up to more than 4 m, and a mutual distance of approximately 1.5 m. A plant for production of 12,000 kg cheese/hour (i.e. a daily consumption of milk of $2.5 \times 10^6$) is of an extent of 13 m in order to allow the cheese mass to stay approximately one hour on each conveyor belt. When the thickness of the cheese cake on the first conveyor belt 1 in such plants is relatively thin, i.e. approximately 100 mm, the cheese cake is not sufficiently strong to cohere when passing freely over the exit end of the first conveyor 1 and downwards towards the guide plate 14. The height of the cheese cake can also be up to 250 to 300 mm, and then the cheese cake is too thick for cohering while passing down to the guide plate 14. The fixed rod 8 and the adjustable rod 10 ensure that the cheese cake cohere everywhere while passing from the first conveyor 1 onto the guide plate 14.

In order to ensure production of a first-class cheese, i.e. said cheese is of a specific texture, taste, and mechanical strength, the cheese cake is suitably stretched from, for instance 250 mm to 150 mm when passing from the first conveyor 1 and down over the fixed rod 8 and the adjustable rod 10 when it is a question of a cheese of the Cheddar type.

The illustrated embodiment of the invention is a preferred embodiment. Many modifications can be performed without thereby deviating from the scope of the invention. The fixed and the adjustable rod 8 and 1 0, respectively, can for instance be replaced by a coherent fixed rod provided the plant is adapted to handle cheese masses forming a cake of a relatively regular thickness. Furthermore, the adjustable rod 10 can have other shapes beyond the one shown, and, if desired, the adjustment thereof can be automatic through a hydraulic or pneumatic drive controlled by sensors measuring the thickness of the cheese cake 7 on the surface of the conveyor 1.

I claim:

1. An apparatus for continuously processing cheese mass, comprising:

a first substantially horizontal conveyor having an exit end which conveys the cheese mass in one direction;

a second substantially horizontal conveyor which conveys the cheese mass in an opposite direction;

a fixed rod comprising a guide surface;

an adjustable rod comprising a guide surface; and a guide plate, said second conveyor being positioned below the first conveyor, wherein the guide surfaces of the fixed rod and adjustable rod are positioned to receive the cheese mass from the exit end of the first conveyor and to support the cheese mass in a downwardly inclining path towards the guide plate which receives the cheese mass therefrom and carries the cheese mass obliquely downwards onto the second conveyor.

2. The apparatus of claim 1, wherein the fixed rod and adjustable rod are adjustable in a clockwise and counter-clockwise position.

3. The apparatus of claim 1, wherein the fixed rod is adjacent to the exit end of the first horizontal conveyor and is positioned between the exit end and the adjustable rod.

4. The apparatus of claim 3, wherein the adjustable rod is an eccentrically mounted body with a surface forming a cylindrical surface of a normal section, the cylindrical surface extending substantially elliptically at least within the guide surfaces in contact with the cheese mass.

5. The apparatus of claim 1, wherein the guide surfaces are downwardly inclined approximately 40° relative to horizontal.

\* \* \* \* \*